United States Patent
Kamimura et al.

(10) Patent No.: US 7,317,720 B2
(45) Date of Patent: Jan. 8, 2008

(54) SIGNAL TRANSMISSION SYSTEM

(75) Inventors: Takeshi Kamimura, Kanagawa (JP); Kazuhiro Suzuki, Kanagawa (JP); Kazuhiro Sakai, Kanagawa (JP); Tsutomu Hamada, Kanagawa (JP); Tomo Baba, Kanagawa (JP); Shinobu Ozeki, Kanagawa (JP); Masaru Kijima, Kanagawa (JP); Masaaki Miura, Kanagawa (JP); Osamu Ueno, Kanagawa (JP); Yoshihide Sato, Kanagawa (JP); Masao Funada, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1014 days.

(21) Appl. No.: 10/397,319

(22) Filed: Mar. 27, 2003

(65) Prior Publication Data
US 2004/0042449 A1 Mar. 4, 2004

(30) Foreign Application Priority Data
Aug. 30, 2002 (JP) .............................. 2002-256031

(51) Int. Cl.
H04L 12/50 (2006.01)
H04B 1/44 (2006.01)
H04J 3/06 (2006.01)

(52) U.S. Cl. .................. 370/366; 370/282; 370/503
(58) Field of Classification Search ........ 370/282–347, 370/366–395, 468–509; 398/28–38, 135–164
See application file for complete search history.

(56) References Cited

U.S. PATENT DOCUMENTS

| | | | | |
|---|---|---|---|---|
| 5,253,254 A * | 10/1993 | Roberts et al. | ............. | 375/368 |
| 5,446,846 A * | 8/1995 | Lennartsson | ................ | 710/100 |
| 5,590,284 A * | 12/1996 | Crosetto | ...................... | 712/29 |
| 5,771,111 A * | 6/1998 | Domon et al. | ................ | 398/76 |
| 5,956,169 A * | 9/1999 | Shimizu | ..................... | 398/155 |
| 5,970,067 A * | 10/1999 | Sathe et al. | ................. | 370/394 |
| 6,370,159 B1 * | 4/2002 | Eidson | ....................... | 370/503 |
| 6,701,086 B1 * | 3/2004 | Heiles | .......................... | 398/30 |
| 6,768,734 B2 * | 7/2004 | Wenk | .......................... | 370/366 |
| 7,027,730 B2 * | 4/2006 | Nagayama et al. | ........... | 398/37 |
| 7,031,347 B2 * | 4/2006 | Spooner | ..................... | 370/503 |
| 7,035,503 B2 * | 4/2006 | Hamada et al. | ............... | 385/24 |

FOREIGN PATENT DOCUMENTS

JP    A 10-123350    5/1998

OTHER PUBLICATIONS

Teiji Uchida, "The 9th JIPC Annual Meeting", 15C01, pp. 201-202.
Tomimura et al., "Packaging Technology for Optical Interconnects", IEEE Tokyo, No. 33, pp. 81-86, 1994.
Wada, "Electronics", pp. 52-55, 1993.

* cited by examiner

Primary Examiner—Man U. Phan
(74) Attorney, Agent, or Firm—Oliff & Berridge, PLC

(57) ABSTRACT

A signal transmission system has a master node and plural slave nodes performing data transmission with the master node. The master node has a serial-to-parallel converter for converting a serial data signal from each slave node into a parallel data signal. Each slave node has a transmission aligner for performing word alignment processing upon a parallel data signals, and a parallel-to-serial converter for converting the parallel data signal subjected to the word alignment processing by the transmission aligner into a serial data signal, and outputting the serial data signal to the master node.

5 Claims, 7 Drawing Sheets

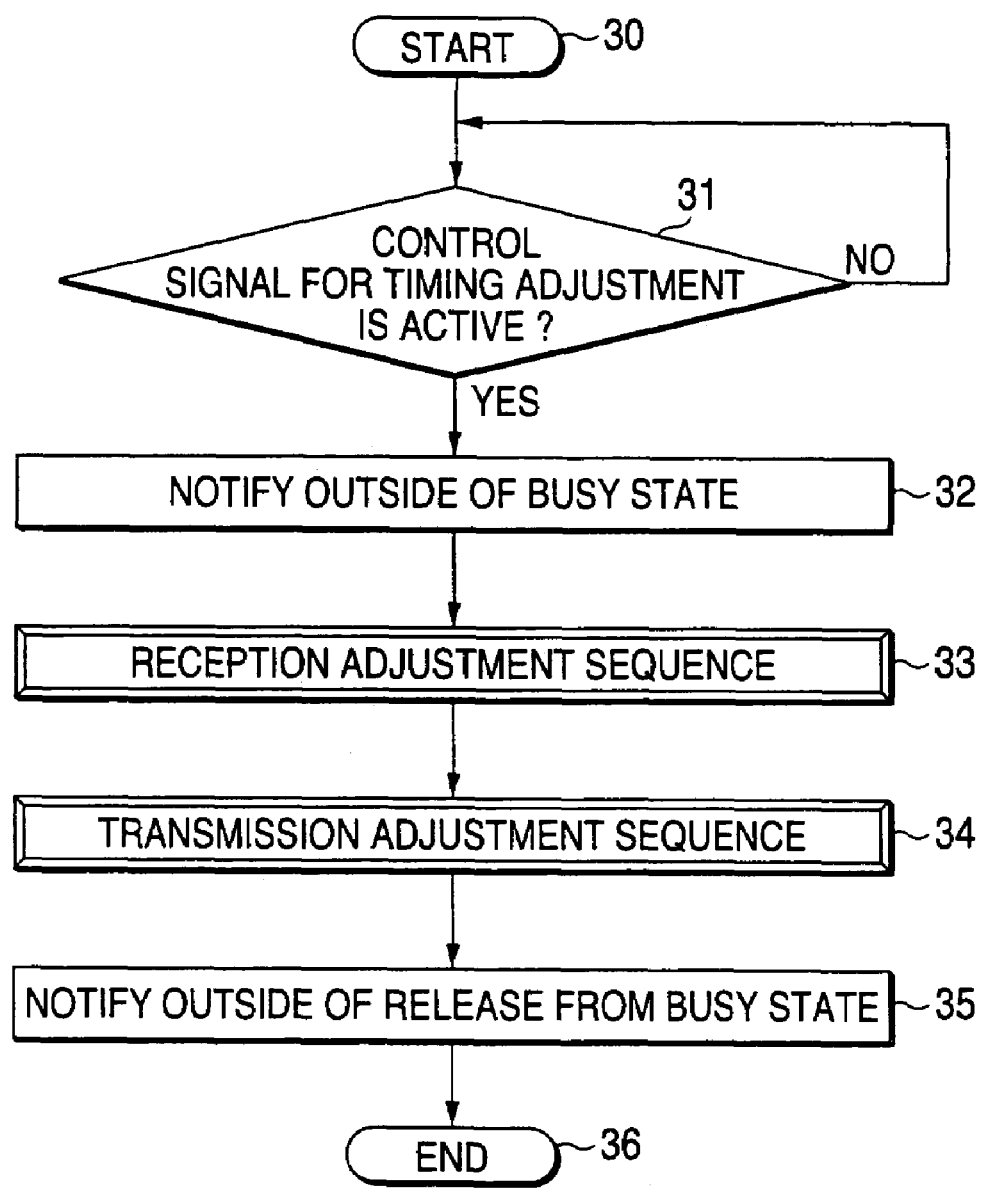

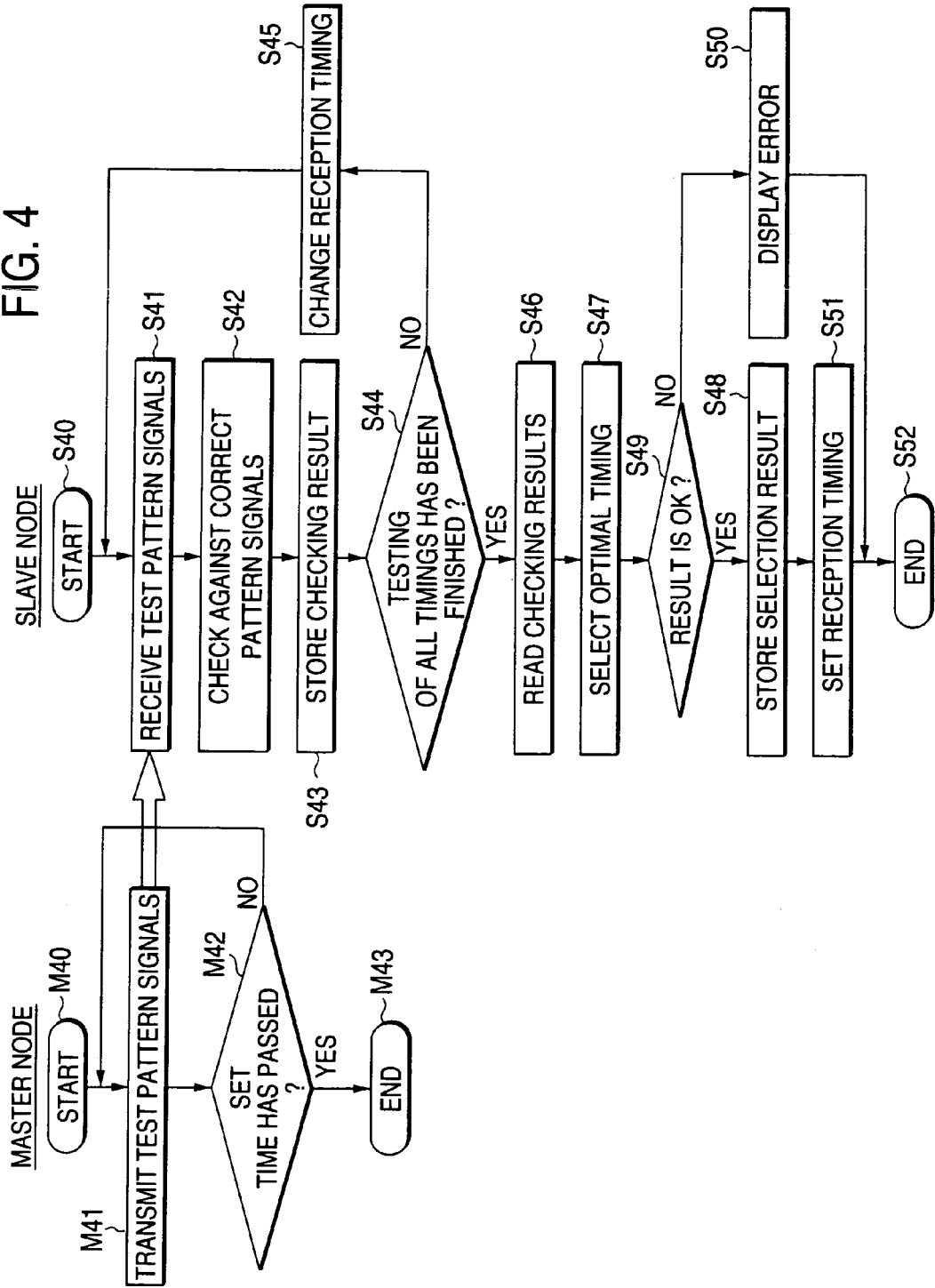

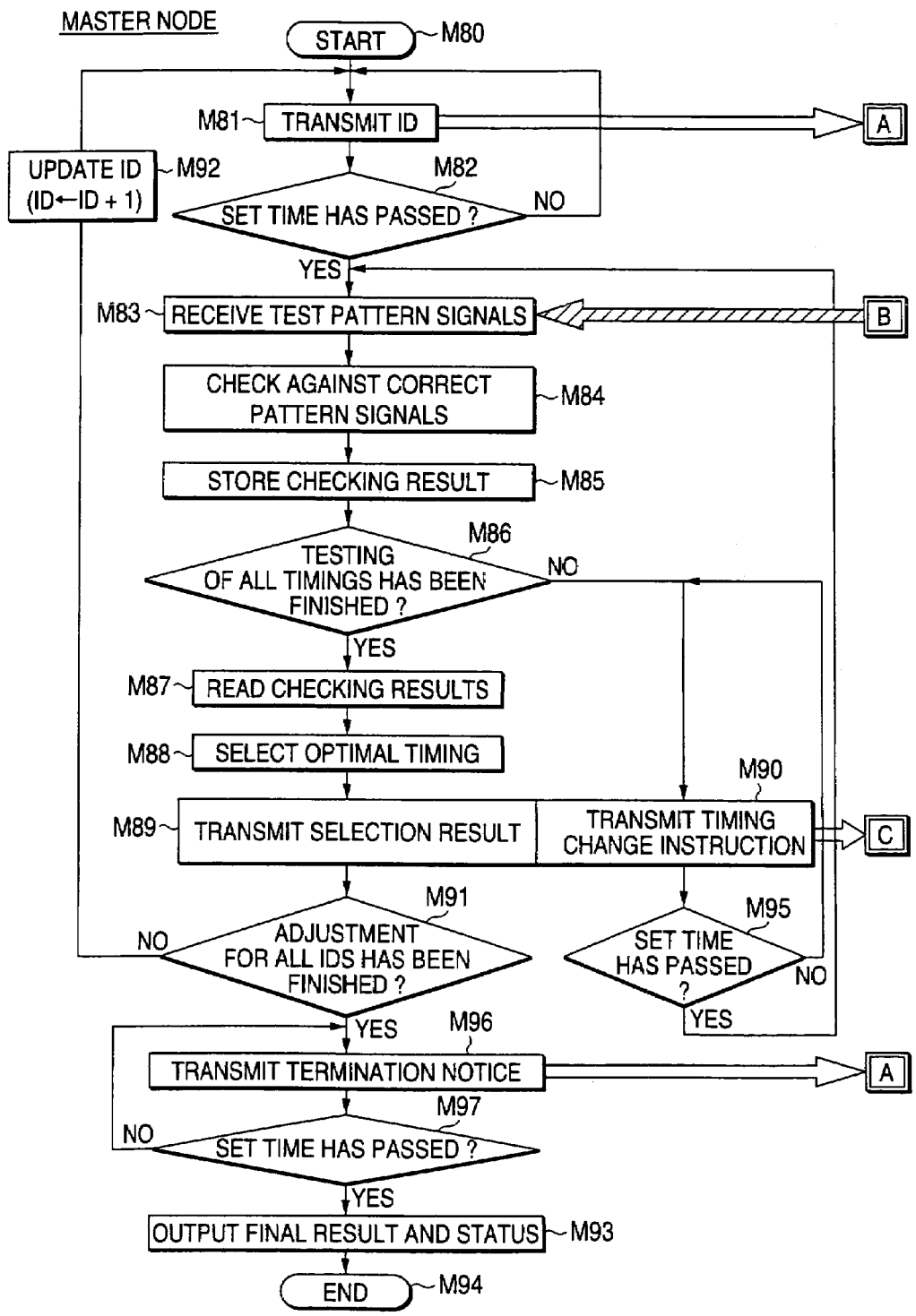

SIGNAL TRANSMISSION SYSTEM

CROSS REFERENCE OF RELATED APPLICATION

This application is based on and claims priority under 35 U.S.C. § 119 with respect to Japanese Patent Application No. 2002-256031 filed on Aug. 30, 2002, the entire content of which is incorporated herein by reference.

BACKGROUND OF THE INVENTION

1. Field of the Invention

A present invention relates to a signal transmission system for performing one-to-many internode data transmission using a serial transmission path.

2. Description of the Related Art

In recent years, the data processing rate of LSIs has increased dramatically with the improvement of semiconductor integration technology. With the increase in data processing rate, wiring substrates for mounting semiconductor integrated circuits thereon are required to improve their signal transmission capacity. Particularly, even in personal computers, which are high-ranking server-type systems, a so-called parallel processing architecture is recently adopted, in which a plurality of high-speed CPU chips are provided. For example, the technology of parallel processing architecture is disclosed in "Parallel Computer" Hideharu Amano, pp.6-13, SHOKODOCO., LTD. According to this, when a system including a plurality of modules such as CPUs for performing data processing is constructed, the method for connecting the modules are classified into a bus connection type, a switch connection type and an interconnection network type. Of these types, the bus connection type is not suitable for connecting a large number of modules, but there is a merit that it has a simple structure in comparison with the other types, while the quantity of hardware is small and the scalability is also excellent. Thus, the bus connection type is often used in commercial computers including personal computers, or computer application products such as page printers.

For mounting intermodule connection portions in a parallel processing system, a large number of connectors and wires are required. In order to improve the communication performance or the wiring density, the wires are therefore formed as multilayer wires or micro-wires. However, such a method is reaching a limit due to signal delay or transmitted waveform distortion caused by inter-wire capacitance or connection wire resistance. In addition, with an increase in working speed, electromagnetic interference (EMI) also becomes a main problem.

In such a manner, the throughput of data processing apparatus has been often restricted by the transmission capacity of a bus on a wiring substrate. In order to break down such a limit of an electric type bus, it comes under consideration to use an intrasystem optical connection technique, which is called "optical interconnection". Various forms have been proposed in accordance with the details of the system configuration as disclosed in "The 9th JIPC Annual Meeting" Teiji Uchida, 15C01, pp.201-202, "Packaging Technology for Optical Interconnects" H. Tomimura, et al, IEEE Tokyo, No. 33, pp.81-86, 1994, and "Electronics" April in 1993, Osamu Wada, pp.52-55, where the summary of the optical interconnection technology is described. According to the optical interconnection technology, there are merits that EMI can be reduced in spite of working at a frequency that can be higher than in the electric type, that no physical connection wire is required for bus signal lines, that the transmission bandwidth can be expanded by multiplexing using wavelength, intensity or the like, and that simultaneous two-way communication can be attained.

Particularly, spatial optical transmission technology is in good consistency with the bus connection type parallel processing architecture because it can attain simultaneous communication among many ports differently from the transmission technology using optical fibers. A related technology is disclosed in JP-A-10-123350. This technology attains optical communication among ports placed in end surfaces of a flat-plate type light guide path, in which incident signal light from one end surface is diffused and transmitted to the opposite end surface so as to attain broadcast communication. By use of multiplex transmission, a plurality of broadcast communications independent of one another can be carried out simultaneously.

As such a signal transmission system technique making use of spatial optical transmission, there has been proposed a system in which a serial signal (serial data signal) obtained by parallel-to-serial conversion of a plurality of electric signal lines is optically transmitted through a spatial optical transmission medium in order to relieve the problem of transmission skew among signals and to reduce the number of transmission paths. Particularly, here is adopted a system in which only a data signal and a frame signal are transmitted from a transmitting node to a receiving node without transmitting a clock signal. The frame signal means a transmission frequency of an electric signal line, while the clock signal means a transmission frequency of the serial signal obtained after the parallel-to-serial conversion. The clock signal is required for latching the serial signal in the receiving node. Here, the clock signal is generated automatically by a unit such as a PLL (Phase Locked Loop) circuit multiplying the frequency of the received frame signal. As a result, it is not necessary to transmit the clock signal having a high frequency particularly in optical transmission. Thus, the transmission band required by optical components and circuit components constituting a transmission path can be narrowed so that the transmission system can be constructed easily.

Such a system for transmitting a serial data signal obtained by parallel-to-serial conversion uses a technique for converting a parallel data signal into a serial data signal by parallel-to-serial conversion, transmitting the serial data signal, receiving the serial data signal, and then restoring the received serial data signal to the original parallel data signal by serial-to-parallel conversion. In this case, even if the serial data signal can be latched in a reception circuit, the bit order will be shifted from that of the original parallel data signal when the transmission delay time of the synchronization signal differs from that of the serial data signal. Therefore, processing for shifting bits in position is typically performed by an alignment circuit in the reception circuit so that the signal is aligned to be restored to its original bit order. This processing can be applied to one-to-one or one-to-many internode signal transmission.

However, when signal is transmitted from the multi-node side to the single-node side in the one-to-many internode signal transmission, one and the same reception node receives signals from different transmission nodes. Therefore, the quantity with which the bit positions should be shifted differs from one transmission node to another. There can be therefore considered a method in which a transmission node number is identified in the reception node, and a correct shift quantity is changed for each transmission node.

However, this method has such problems that the circuit becomes complicated, and the method cannot be used when the reception node cannot identify a transmission node.

SUMMARY OF THE INVENTION

It is therefore an object of the invention to solve the foregoing problems and to provide a signal transmission system in which one-to-many internode data transmission using a serial transmission path can be performed in good condition with a simple configuration.

In order to achieve the object, according to the invention, there is provided a signal transmission system including a master node; and a plurality of slave nodes for performing data transmission with the master node, wherein the master node includes a serial-to-parallel converter for converting a serial data signal from each of the slave nodes into a parallel data signal, and wherein each of the slave nodes includes a transmission aligner for performing word alignment processing upon a parallel data signal, and a parallel-to-serial converter for converting the parallel data signal subjected to the word alignment processing by the transmission aligner into a serial data signal, and outputting the serial data signal to the master node.

The master node may include a parallel-to-serial converter for converting a parallel data signal into a serial data signal and outputting the serial data signal to the slave nodes, and each of the slave nodes may include a serial-to-parallel converter for converting the serial data signal from the master node into a parallel data signal, and a reception aligner for performing word alignment processing upon the parallel data signal converted by the serial-to-parallel converter.

In addition, the master node may include a master timing adjustment portion for executing a reception adjustment sequence and a transmission adjustment sequence during a period in which data transmission is not carried out, the reception adjustment sequence being provided for adjusting reception timing between a data signal and a synchronization signal outputted by the master node individually for each slave node, the transmission adjustment sequence being provided for adjusting transmission timing between a data signal and a synchronization signal outputted by each slave node individually for each slave node; and each of the slave nodes may include a reception timing control portion for changing reception timing of a data signal, a transmission timing control portion for changing transmission timing of a data signal, and a slave timing adjustment portion for issuing an instruction in accordance with a command from the master timing adjustment portion, so that an instruction to change reception timing is given to the reception timing control portion during execution of the reception adjustment sequence so as to adjust the reception timing while giving an instruction of word alignment processing to the reception aligner, and an instruction to change transmission timing is given to the transmission timing control portion during execution of the transmission adjustment sequence so as to adjust the transmission timing while giving an instruction of word alignment processing to the transmission aligner.

Preferably, the master timing adjustment portion performs the reception adjustment sequence and the transmission adjustment sequence in that order. In addition, data transmission between the master node and each of the slave nodes maybe performed through an optical transmission medium.

With such a configuration, one-to-many internode data transmission using a serial transmission path can be performed in good condition with a simple configuration. That is, when word alignment processing is performed in each transmission node, a reception node can receive data without awareness of switching a transmission node in the case where the transmission node is on the multi-node side while the reception node is on the single-node side. Thus, the circuitry is simplified.

BRIEF DESCRIPTION OF THE DRAWINGS

These and other objects and advantages of this invention will become more fully apparent from the following detailed description taken with the accompanying drawings in which:

FIG. 3 is a flow chart showing the whole steps of a timing adjustment sequence to be executed by the signal transmission system according to the invention;

FIG. 4 is a flow chart of the steps of a reception adjustment sequence included in the timing adjustment sequence to be executed by the signal transmission system according to the invention;

FIG. 5 is a flow chart of the steps of a transmission adjustment sequence (master node) included in the timing adjustment sequence to be executed by the signal transmission system according to the invention.

DETAILED DESCRIPTION OF THE PREFERRED EMBODIMENTS

Now, a description will be given in more detail of preferred embodiments of the present invention with reference to the accompanying drawings.

Figure 1:
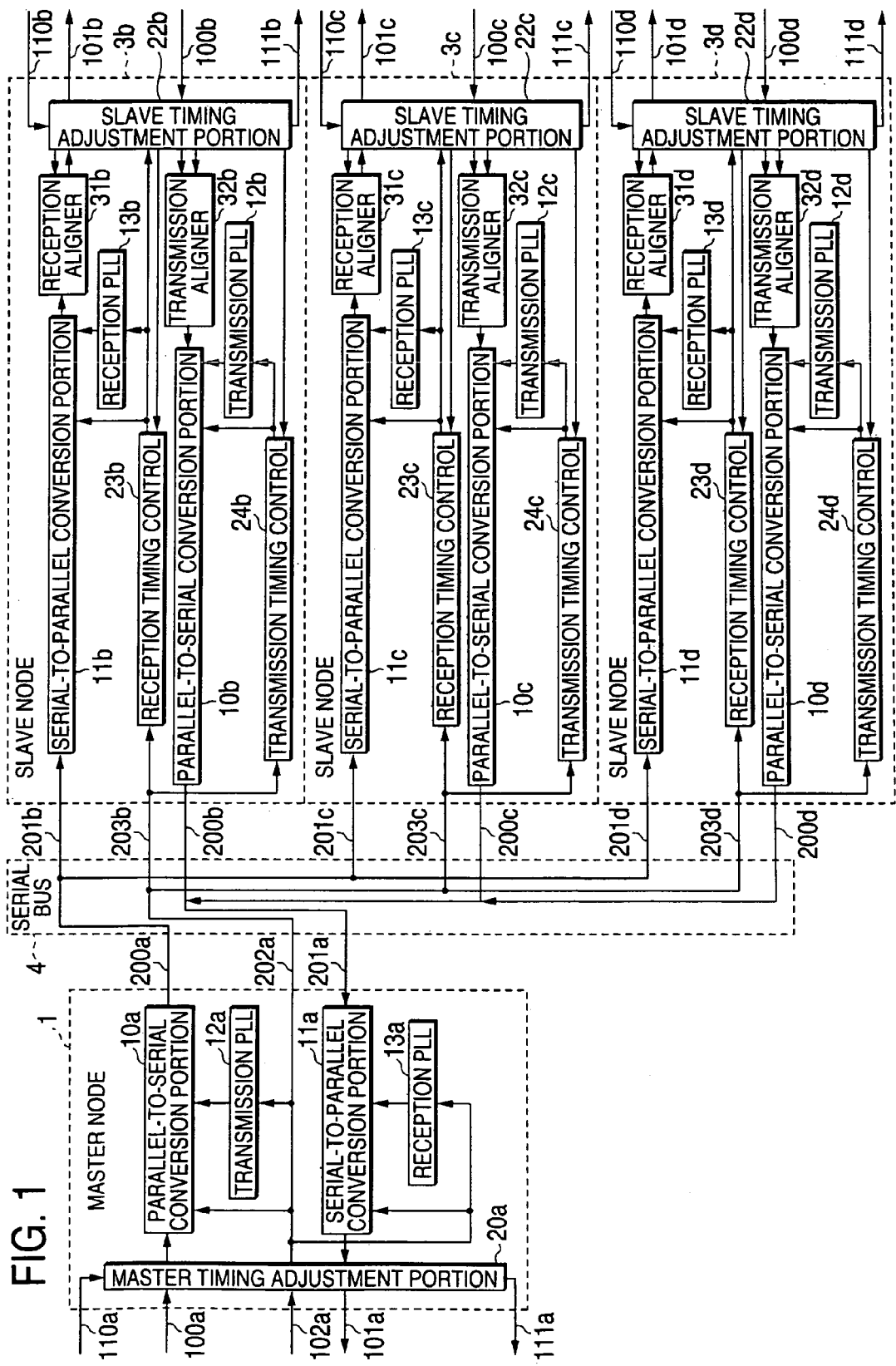
FIG. 1 is a schematic diagram showing a signal transmission system according to an embodiment of the invention.

FIG. 1 is a schematic diagram showing an embodiment of a signal transmission system according to the invention. In this embodiment, as shown in FIG. 1, data transmission is performed between one master node 1 and each of three slave nodes $3b$, $3c$ and $3d$ through a serial bus 4.

The master node 1 has a parallel-to-serial converter $10a$, a transmission PLL $12a$, a serial-to-parallel converter $11a$, a reception PLL $13a$ and a master timing adjustment portion $20a$.

The interface between the master node 1 and an external circuit has inputs made of a parallel data signal $100a$, a synchronization signal $102a$ and a timing adjustment control signal $110a$, and outputs made of a parallel data signal $101a$ and a timing adjustment status signal $111a$. On the other hand, the interface between the master node 1 and the serial bus 4 has an input made of a serial data signal $201a$ and outputs made of a serial data signal $200a$ and a synchronization signal $202a$.

Each of the transmission PLL $12a$ and the reception PLL $13a$ has an input of a synchronization signal and an output of a serial synchronization signal obtained by multiplying the frequency of the input synchronization signal.

The parallel-to-serial converter 10a has inputs of a parallel data signal, a synchronization signal and a serial synchronization signal and an output of a serial data signal obtained by parallel-to-serial conversion of the input parallel data signal. For example, assume that the parallel data signal is of 40 bits each transmitted at a rate of 50 Mbps, the synchronization signal has a frequency of 50 MHz, and the serial synchronization signal has a frequency of 500 MHz. In this case, the output serial data signal is a signal of 4 bits each transmitted at a rate of 500 Mbps.

The serial-to-parallel converter 11a has inputs of a serial data signal, a synchronization signal and a serial synchronization signal, and an output of a parallel data signal obtained by serial-to-parallel conversion of the input serial data signal. For example, assume that the serial data signal is of 4 bits each transmitted at a rate of 500 Mbps, the synchronization signal has a frequency of 50 MHz, and the serial synchronization signal has a frequency of 500 MHz. In this case, the output parallel data signal is a signal of 40 bits each transmitted at a rate of 50 Mbps.

In accordance with an instruction of the control signal 110a, the master timing adjustment portion 20a performs no processing during the execution of data transmission, outputting the parallel data input signal 100a to the parallel-to-serial converter 10a, connecting the output of the serial-to-parallel converter 11a to the parallel data output signal 101a, and making a connection between the synchronization signal 102a and the synchronization signal 202a. Once timing adjustment is started in accordance with an instruction of the control signal 110a, the master timing adjustment portion 20a executes processing corresponding to the master node, of the flow chart shown in FIGS. 3 to 6, which will be described later.

On the other hand, each of slave nodes 3b, 3c, 3d have each of parallel-to-serial converter 10b, 10c, 10d, each of transmission PLLs 12b, 12c, 12d, each of serial-to-parallel converters 11b, 11c, 11d, each of reception PLLs 13b, 13c, 13d, each of slave timing adjustment portions 22b, 22c, 22d, each of reception timing control portions 23b, 23c, 23d, each of transmission timing control portions 24b, 24c, 24d, each of reception aligners 31b, 31c, 31d, and each of transmission aligners 32b, 32c, 32d, correspondingly.

The interface between each of slave nodes 3b, 3c, 3d and an external circuit has inputs made of parallel data signals 100b, 100c, 100d, and timing adjustment control signals 110b, 110c, 110d, and outputs made of parallel data signals 101b, 101c, 101d, and timing adjustment status signals 111b, 111c, 111d. On the other hand, the interface between each slave nodes 3b, 3c, 3d and the serial bus 4 has inputs made of serial data signals 201b, 201c, 201d and synchronization signals 203b, 203c, 203d, and an output made of serial data signals 200b, 200c, 200d.

Each synchronization signals 203b, 203c, 203d is inputted to each reception timing control portions 23b, 23c, 23d and each transmission timing control portions 24b, 24c, 24d. A signal obtained by shifting the phase of the input signal in accordance with an instruction of each slave timing adjustment portions 22b, 22c, 22d is outputted. The phase shift quantity in each timing control portion is provided independently.

The output signal of each serial-to-parallel converters 11b, 11c, 11d is inputted to each reception aligners 31b, 31c, 31d. A result obtained by performing word alignment processing upon the input signal in accordance with an instruction of each slave timing adjustment portions 22b, 22c, 22d is outputted to the slave timing adjustment portions 22b, 22c, 22d.

A signal expressing transmission data is inputted from each slave timing adjustment portions 22b, 22c, 22d to each transmission aligners 32b, 32c, 32d. A result obtained by performing word alignment processing upon the input signal in accordance with an instruction of each slave timing adjustment portions 22b, 22c, 22d is outputted to each parallel-to-serial converters 10b, 10c, 10d.

In accordance with an instruction of each control signals 110b, 110c, 110d, each slave timing adjustment portions 22b, 22c, 22d performs no processing during the execution of data transmission, outputs each parallel data signals 100b, 100c, 100d to each parallel-to-serial converters 10b, 10c, 10d, and connects the output of each serial-to-parallel converters 11b, 11c, 11d to each parallel data signals 101b, 101c, 101d. Once timing adjustment is started in accordance with an instruction of each control signals 110b, 110c, 110d, each slave timing adjustment portions 22b, 22c, 22d executes processing corresponding to the slave node, of the flow chart shown in FIGS. 3 to 6, which will be described later.

Figure 2A:
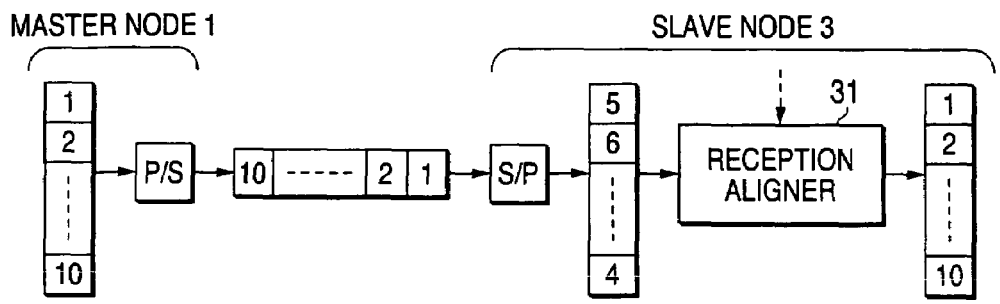
FIG. 2A is a diagram showing an example of an alignment sequence at the time of reception.
Figure 2B:
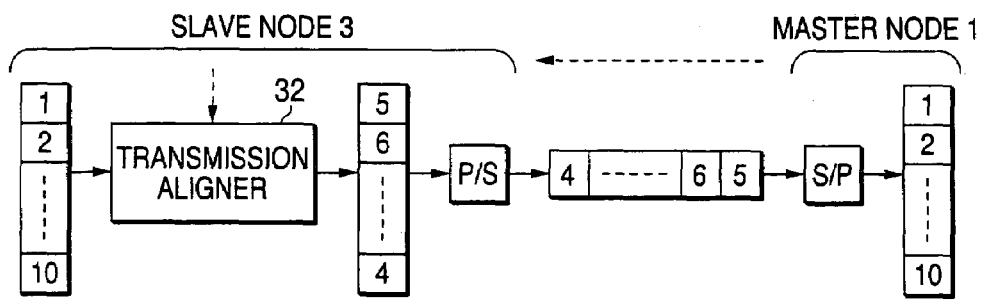
FIG. 2B is a diagram showing an example of an alignment sequence at the time of transmission.
Figure 2C:
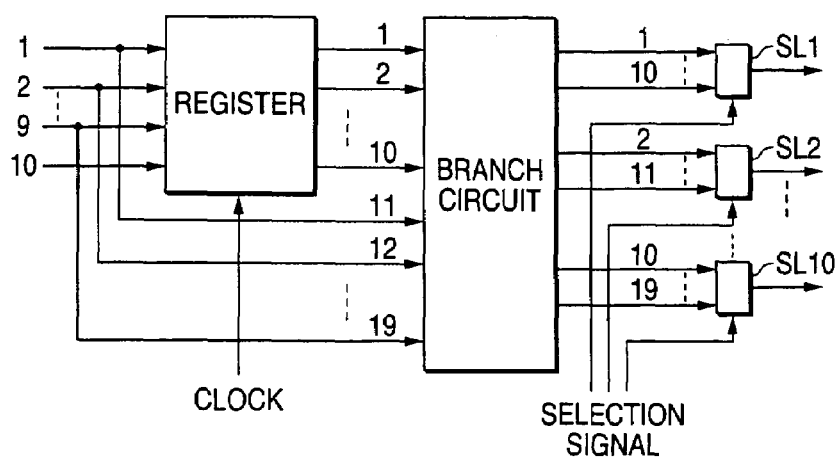
FIG. 2C is a diagram showing an example of the configuration of an aligner.

FIG. 2A is a diagram showing an example of an alignment sequence at the time of reception. FIG. 2B is a diagram showing an example of an alignment sequence at the time of transmission. FIG. 2C is a diagram showing an example of the configuration of an aligner.

When data is received in a slave node, alignment processing is performed as follows. First, as shown in FIG. 2A, a parallel data signal "1/2/ . . . 10" in the master node 1 is converted into a serial data signal "1-2- . . . -10" by the parallel-to-serial converter (P/S), and the serial data signal "1-2- . . . -10" is transmitted. The serial data signal "1-2- . . . -10" received in the slave node 3 is converted into a parallel data signal by the serial-to-parallel converter (S/P). On this occasion, when the transmission delay time of the synchronization signal differs from that of the serial data signal, the bit order is shifted from that of its original parallel data signal, and for example, the parallel data signal is obtained as "5/6/ . . . /4" as shown in FIG. 2A. The reception aligner 31 performs alignment processing in accordance with an instruction from the slave timing adjustment portion 22 so that the data signal is aligned to be restored to its original parallel data signal "1/2/ . . . /10".

When data is transmitted in the slave node, alignment processing is performed as shown in FIG. 2B. Assume that the serial transmission path is similar to that in FIG. 2A, and a serial data signal is received to be 4-bits shifted due to the lag in transmission delay time between the synchronization signal and the serial data signal. The master node 1 uses a timing adjustment sequence, which will be described later, so as to transmit alignment information based on this lag to the slave node 3 in advance. In response to this alignment information, the slave timing adjustment portion 22 gives an instruction of predetermined alignment processing to the transmission aligner 32.

First, the parallel data signal "1/2/ . . . /10" in the slave node 3 is subjected to alignment processing by the transmission aligner 32 so as to be a signal "5/6/ . . . /4", and converted into a serial data signal "5-6- . . . -4" by the parallel-to-serial converter (P/S), and the serial data signal "5-6- . . . -4" is transmitted. The serial data signal "5-6- . . . -4" received in the master node 1 is aligned to be restored to its original parallel data signal "1/2/ . . . /10" by the serial-to-parallel converter (S/P).

In such a manner, word alignment processing is performed in each transmission node so that the reception node can receive data without awareness of switching a transmission node. Thus, the circuitry is simplified.

In this embodiment, each of the transmission aligners and the reception aligners can be constituted by a 10-bit register, a branch circuit, and 10-inputs/1-output selectors as shown in FIG. 2C. By the circuit shown in FIG. 2C, a consecutive 10-bit signal can be outputted from consecutive 2 words of a 19-bit signal transmitted on the serial bus. The register holds the respective signals 1-10 inputted thereto, synchronously with a clock. A total of 19 bits of signals 11-19 obtained by copying the input signals 1-9 respectively and signals 1-10 outputted from the register are inputted to the branch circuit, in which input signals to selectors SL1 to SL10 are generated respectively. A selection signal is given to each of the selectors SL1 to SL10, and one output is made from each selector in accordance with the selection signal. Thus, predetermined alignment processing is performed. These selection signals are supplied from the slave timing adjustment portion 22.

Next, referring to FIGS. 3 to 6, description will be made on timing adjustment sequences other than the aforementioned sequences. These sequences are executed by the master timing adjustment portion 20a and the slave timing adjustment portions 22b to 22d.

FIG. 3 shows a flow chart of the whole of the sequences. The sequences start in a step 30. When the control signal 110a (110b-110d) for timing adjustment is detected in a step 31, the status signal 111a (111b-111d) is made active in a step 32, and a notice of a busy state is given to the outside. Thus, input/output of the data signals 100a (100b-100d) and 101a (101b-101d) is forbidden during the processing for timing adjustment.

Next, a reception adjustment sequence is executed in a step 33, and then a transmission adjustment sequence is executed in a step 34. When these sequences are terminated, the busy state set to the outside is released in a step 35. Then, the whole of sequences is terminated in a step 36.

FIG. 4 shows a flow chart of the reception adjustment sequence. Of the step block names in FIGS. 4 to 6 as will be described below, the names each having an initial letter of M designate processes to be performed by the master timing adjustment portion 20a, and the names each having an initial letter of S designate processes to be performed by the slave timing adjustment portions 22b to 22d. In addition, the thick arrows designate signal exchange between the master node 1 and the slave node.

The reception adjustment sequence is started in a step M40, and then a step M41 to be executed by the master timing adjustment portion 20a is started. This means a process for transmitting a test pattern signal from the parallel-to-serial converter 10a to all the slave nodes. This test pattern is stored in a storage unit such as a memory in both the master timing adjustment portion 20a and the slave timing adjustment portion 22b-22d in advance.

For example, in the case of a 10-bit signal, the following repeating patterns can be used as the test pattern.

|   |   |
|---|---|
| bit sequence 1 | "0001110101" |
| bit sequence 2 | "0011010101" |

Although the requirements of the test pattern depend on the specification of the transmission path, for example, the following conditions are required.
   condition 1: the logical value "1" occupies 40 to 60 percentages of the bit sequence
   condition 2: it can be judged from the pattern itself which bit is a start bit Both the bit sequences 1 and 2 satisfy the conditions 1 and 2.

The master timing adjustment portion 20a continues to transmit the test pattern signal for a predetermined time in a step M42. Then, the processing is terminated in a step 43. Here, the predetermined time means a time much longer than the processing time required for steps S41 to S52 carried out by the slave timing adjustment portion 22b-22d, which steps will be described later.

The processing of the slave timing adjustment portion 22b-22d will be described. All the following processes are executed in the slave node.

The processing is started in a step S40. The test pattern signal transmitted in the step M41 is received in a step S41. At this time, it is necessary for the slave timing adjustment portion 22b-22d to set an initial value of reception timing in advance for the reception timing control portion 23b-23d.

In a step S42, the received test pattern is checked against a correct pattern stored in advance. The checking result is stored in the memory in a step S43. Here, for example, assume that the aforementioned bit sequence 1 is the correct pattern while the received test pattern is:
   bit sequence 3 "1000111010"

In this case, each bit has been received correctly, but the position of the start bit has been shifted to the lower side by one bit simply. Thus, the correct pattern can be obtained by word alignment. Accordingly, the following two results are stored as the checking result.
   result 1: whether all of individual bits have been received correctly or not
   result 2: how many bit shifts are required for correction when the result 1 is OK In a step S44, it is judged whether testing about all the reception timings has been finished or not. When the testing has not been finished, the reception timing is changed in a step S45, and the processing returns to the step S41. Here, the change of the reception timing is executed by the reception timing control portion 23b-23d in accordance with an instruction from the slave timing adjustment portion 22b-22d.

When the testing has been finished, all the checking results are read from the memory in a step S46. The optimal reception timing is determined in a step S47. The following Table 1 shows an example of checking results using 8 kinds of reception timings varied continuously. Here, of the reception timings 3-7 whose "result 1" is OK, the reception timing 5 in the middle is determined to be the optimal reception timing.

As the method for determining the optimal reception timing, a lookup table may be used in which each address is of 8 bits expressing the "result 1", and the optimal reception timing is stored for each address in advance. In the example of Table 1, assume that the value of OK is "1", the value of NG is "0", the "result 1" of the reception timing 8 is set in MSB, and the "result 1" of the reception timing 1 is set in LSB. In this case, a value expressing the reception timing 5 is stored in the address "01111100", that is, the address No. 124 in advance.

TABLE 1

|   | RESULT 1: RECEPTION OF ALL BITS IS OK? | RESULT 2: NUMBER OF SHIFTS | OPTIMAL RECEPTION TIMING |
|---|---|---|---|
| TIMING 1 | NG | — |   |
| TIMING 2 | NG | — |   |

TABLE 1-continued

| | RESULT 1: RECEPTION OF ALL BITS IS OK? | RESULT 2: NUMBER OF SHIFTS | OPTIMAL RECEPTION TIMING |
|---|---|---|---|
| TIMING 3 | OK | 1 BIT TO RIGHT | |
| TIMING 4 | OK | 1 BIT TO RIGHT | |
| TIMING 5 | OK | 0 | ○ |
| TIMING 6 | OK | 0 | |
| TIMING 7 | OK | 1 BIT TO LEFT | |
| TIMING 8 | NG | — | |

Since it can be also considered that all the results are NG, it is judged in a step S49 whether a receivable result can be obtained or not. When all the results are NG, the reception timing is regarded as impossible to set, and an error signal is outputted to the outside in a step S50. Otherwise, the result is stored in the memory in a step S48, and the optimal reception timing is set for the reception timing control portion 23b-23d in a step S51.

Thus, the processing of the slave timing adjustment portion 22b-22d is terminated.

Figure 6:
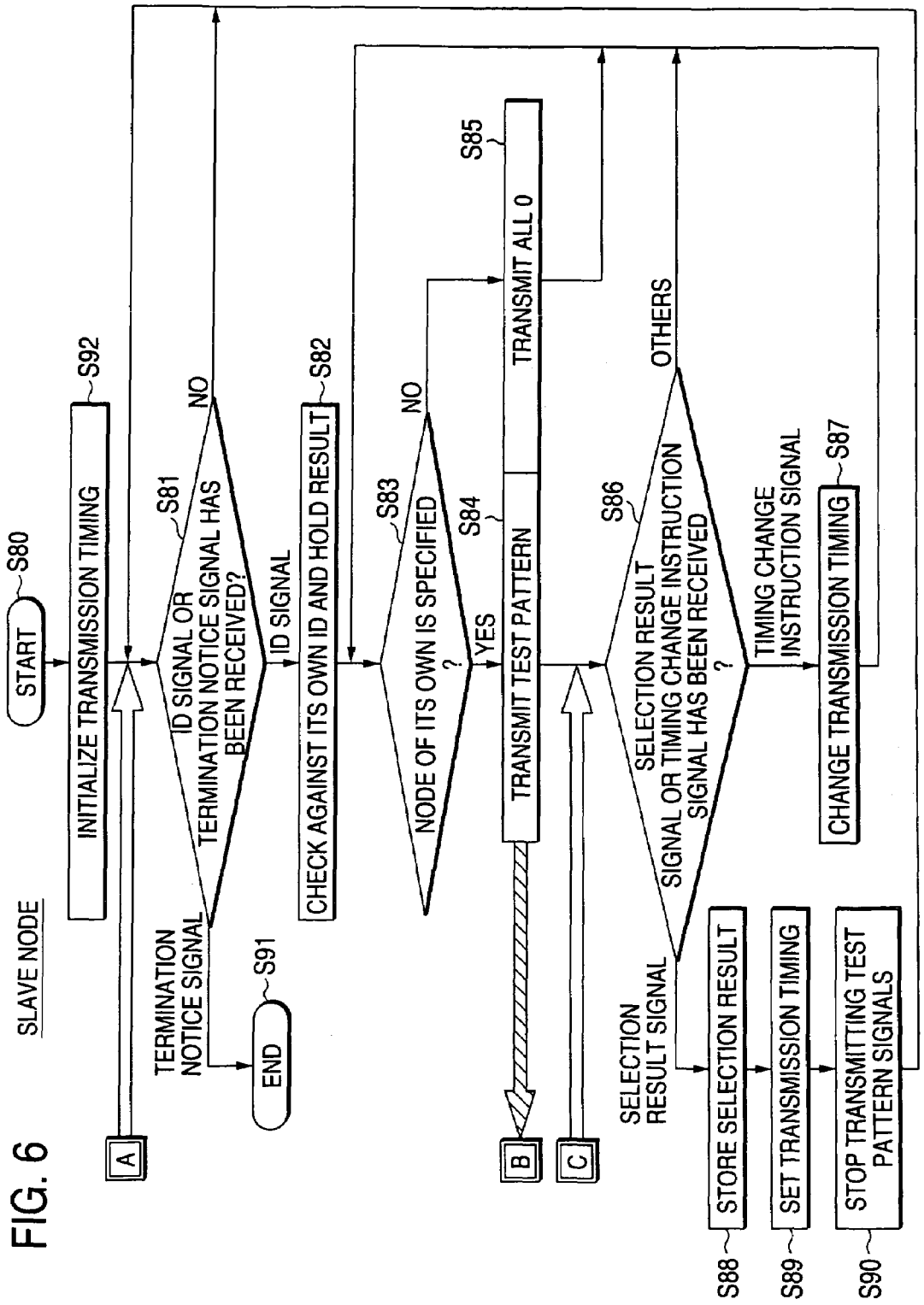
FIG. 6 is a flow chart of the steps of a transmission adjustment sequence (slave node) included in the timing adjustment sequence to be executed by the signal transmission system according to the invention.

Next, description will be made on the transmission adjustment sequence with reference to FIGS. 5 and 6. FIG. 5 shows the processing in the master node while FIG. 6 shows the processing in the slave node. FIGS. 5 and 6 are connected with each other through "A", "B" and "C" illustrated correspondingly.

The transmission adjustment sequence is started in a step M80. A step M81 to be executed by the master timing adjustment portion 20a is started. This shows a process for transmitting an ID signal (a signal using an ID number as data signal, which ID number is set in advance for identifying each slave node) from the parallel-to-serial converter 10a to all the slave nodes. The step M81 is required for specifying the slave nodes one by one from the master node side because the transmission adjustment sequence is executed based on one-to-one transmission between each individual slave node and the master node.

The master timing adjustment portion 20a continues to transmit the ID signal for a predetermined time in a step M82. Then, in a step M83, the master timing adjustment portion 20a receives a test pattern transmitted from a slave node. Here, the predetermined time means a time much longer than the processing time required for steps SB1 to S85 carried out by the slave timing adjustment portion 22b-22d, which steps will be described below.

The processing of the slave timing adjustment portion 22b-22d will be described. The following processing of the slave timing adjustment portion 22b-22d is executed in all the slave nodes.

In FIG. 6, the processing is started in a step S80. First, the transmission timing is initialized in a step S92. The ID signal transmitted in the step M81 is received in a step S81, and it is judged whether it is an ID signal or a termination notice signal. When the termination notice signal has been received, the processing is terminated in a step S91. When the ID signal has been received, the ID number indicated by the ID signal is checked against the ID number of each slave node in a step S82. In a step S83, it is judged whether the node of its own is specified or not. This judgment result is held by a storage unit such as a register.

As a result of the step S83, the slave node specified by the ID signal transmits a test pattern signal to the master node 1 in a step S84. The test pattern signal is similar to that in the step M41 in FIG. 4, and description thereof will be therefore omitted. On the other hand, any slave node not specified by the ID signal transmits a test pattern signal filled with logical values "0" in a step S85. The steps S84 and S85 are executed at similar timing and the respective signals therefrom are merged in the serial bus. It is therefore necessary to select the signal in the step S85 so as to transmit the test pattern signal in the step S84 to the master node 1 correctly without suffering influence of the merging.

Next, description will be made on the processing of the master timing adjustment portion 20a. The four steps M83-M86 are similar to the steps S41-S44 in FIG. 4 respectively, and description thereof will be therefore omitted.

In a step M 86, it is judged whether testing about all the transmission timings in the slave node specified currently has been finished or not. When the testing has not been finished, a timing change instruction signal is transmitted to the slave node in a step M90. Here, the timing change instruction signal is an instruction signal for changing the transmission timing from the slave node and testing the transmission timing again. Next, in a step M95, the timing change instruction signal is continuously transmitted for a predetermined time. Then, the processing returns to the step M83, executing the steps M83-M86. The predetermined time in the step M95 means a time much longer than the processing time required for the steps S86-S87 and S83-S85 carried out by the slave timing adjustment portion 22b-22d, which steps will be described later.

On the other hand, when the testing is finished, all the checking results are read from the memory in a step M87, and the optimal timing is determined in a step M88. The determined result is transmitted as a selection result signal to the slave node in a step M89. The steps M87 and M88 are similar to the steps S46 and S47 in FIG. 4, and description thereof will be therefore omitted.

Next, in a step M91, it is judged whether the transmission timing adjustment has been finished for all the slave nodes or not. When the adjustment has not been finished, the ID number of the slave node is updated in a step M92, and the processing returns to the step M81 for performing the transmission timing adjustment for the next slave node. When the adjustment has been finished, a termination notice signal is continuously transmitted to the slave nodes for a predetermined time in steps M96 and M97. Here, the predetermined time means a time much longer than the processing time required for the step S81 carried out by the slave timing adjustment portion 22b-22d. Lastly, in a step M93, the final result and the status are outputted. Then, the processing is terminated in a step M94.

In a step S86, the slave timing adjustment portion 22b-22d receives the signal transmitted in the step M89 or M90 by the master timing adjustment portion 20a.

When the received signal is a timing change instruction signal, an instruction to change the data transmission timing is given to the transmission timing control portion 24b-24d in a step S87. Further, the processing returns to the step S83.

When the received signal is a selection result signal, the result is stored in the memory in a step S88, and set to the transmission timing control portion 24b-24d in a step S89. Further, transmitting the test pattern to the master node 1 is stopped in a step S90. Then, the processing returns to the step S81.

When a signal other than the aforementioned signals is received in the step 86, the processing returns to the step S83 so that the test pattern signal is continuously transmitted.

Figure 7:
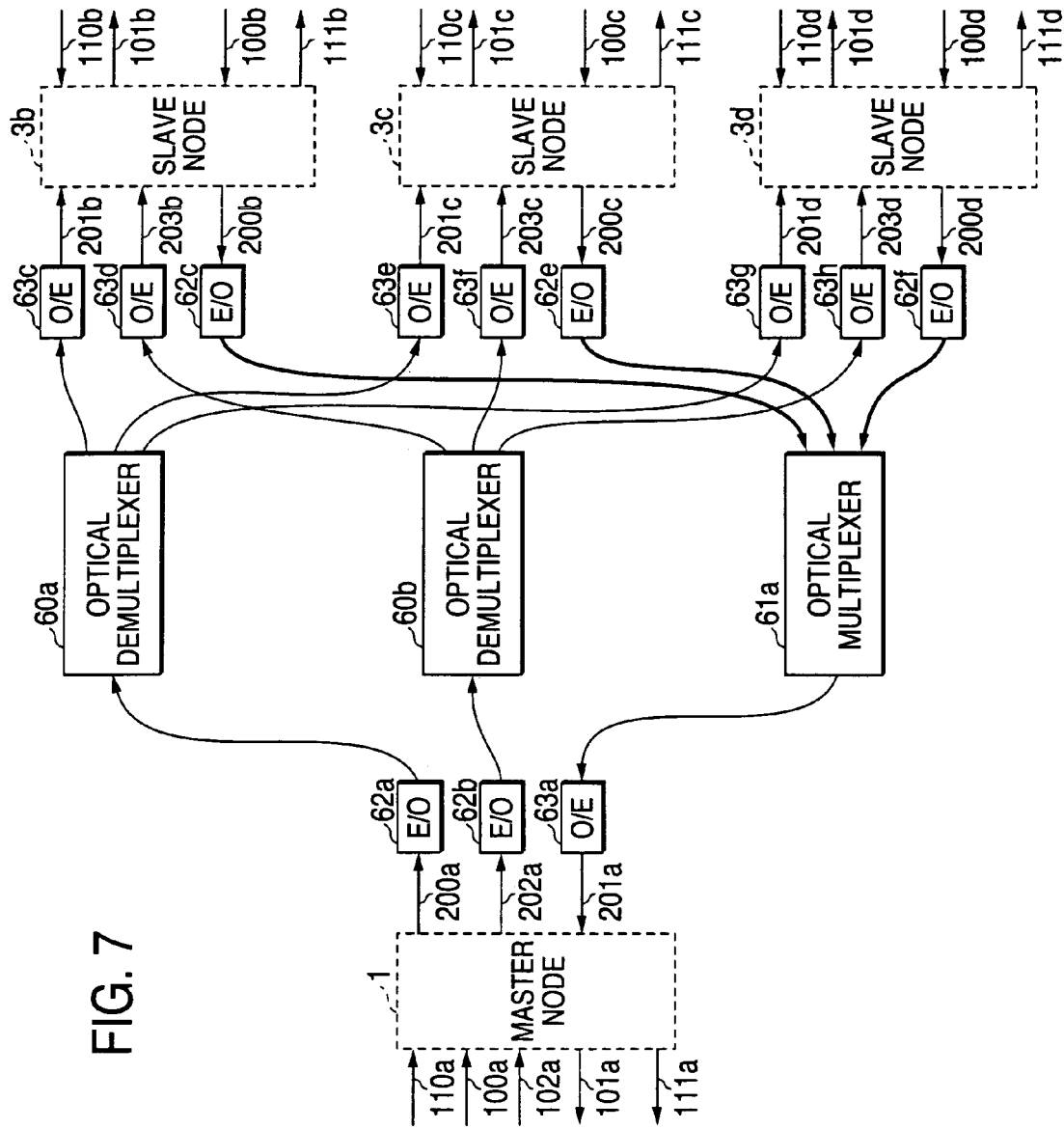
FIG. 7 is a schematic diagram showing a signal transmission system according to another embodiment of the invention.

FIG. 7 is a schematic diagram showing another embodiment of a signal transmission system according to the invention.

In the configuration of FIG. 7, the portion corresponding to the serial bus in the previous embodiment is replaced by optical demultiplexers 60 (60a and 60b) an optical multiplexer 61 (61a), electro-optic converters 62 (62a-62f) and opto-electric converters 63 (63a-63h) The other configuration as to the master node 1, the slave nodes 3b-3d and signals in the respective portions is similar to that in the previous embodiment, and description thereof will be therefore omitted.

In the second embodiment, a serial data signal and a frame signal transmitted from each portion are converted into optical signals, and transmitted through an optical transmission medium such as an optical fiber or an optical bus which will be described later. The optical signals are converted into electric signals on the reception side.

Each optical demultiplexer 60 has one entrance port and three exit ports for optical signals. A light guide path is designed to obtain optical signals with an equal quantity of light in the respective exit ports in response to the entrance of an optical signal from the entrance port. For example, a star coupler or the like can be used as the optical demultiplexer 60. Alternatively, an optical bus disclosed in Japanese Patent Laid-Open No. 123350/1998 or No. 123374/1998 may be used. Such an optical bus diffuses signal light through the inside of a sheet-like optical transmission medium or its entrance end surface so as to obtain signal light on a uniform light intensity level in the exit end surface.

The optical multiplexer 61 has three entrance ports and one exit port for optical signals. A light guide path is designed to obtain an optical signal with a fixed quantity of light in the exit port even if an optical signal is inputted from any entrance port. A star coupler or an optical bus can be used as the optical multiplexer 61 in the same manner as the optical demultiplexer 60.

Each electro-optic converter 62 converts an electric signal outputted from each node into an optical signal, and outputs the optical signal. The electro-optic converter 62 is constituted by a light emitting device such as a light emitting diode (LED) and a drive circuit therefor.

Each opto-electric converter 63 converts the optical signal outputted from the optical demultiplexer 60 or the optical multiplexer 61 into an electric signal, and connects the electric signal to each node. The opto-electric converter 63 is constituted by a light receiving device such as a photodiode and an amplification circuit of an output signal thereof.

Although the electro-optic converters 62 and the opto-electric converters 63 are formed as different blocks from each node in FIG. 7, they may be included in each node respectively.

According to the invention, one-to-many internode signal transmission can be attained by a serial bus. Particularly, when word alignment processing is performed in each transmission node in transmission from the multi-node side to the single-node side, the reception node can receive data without awareness of switching the transmission node. Thus, the circuitry can be simplified.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

[FIG. 1]
1 MASTER NODE
10a PARALLEL-TO-SERIAL CONVERSION PORTION
12a TRANSMISSION PLL
11a SERIAL-TO-PARALLEL CONVERSION PORTION
13a RECEPTION PLL
20a MASTER TIMING ADJUSTMENT PORTION
4 SERIAL BUS
3b SLAVE NODE
11b SERIAL-TO-PARALLEL CONVERSION PORTION
13b RECEPTION PLL
10b PARALLEL-TO-SERIAL CONVERSION PORTION
12b TRANSMISSION PLL
23b RECEPTION TIMING CONTROL
24b TRANSMISSION TIMING CONTROL
31b RECEPTION ALIGNER
32b TRANSMISSION ALIGNER
22b SLAVE TIMING ADJUSTMENT PORTION
3c SLAVE NODE
11c SERIAL-TO-PARALLEL CONVERSION PORTION
13c RECEPTION PLL
10c PARALLEL-TO-SERIAL CONVERSION PORTION
12c TRANSMISSION PLL
23c RECEPTION TIMING CONTROL
24c TRANSMISSION TIMING CONTROL
31c RECEPTION ALIGNER
32c TRANSMISSION ALIGNER
22c SLAVE TIMING ADJUSTMENT PORTION
3d SLAVE NODE
11d SERIAL-TO-PARALLEL CONVERSION PORTION
13d RECEPTION PLL
10d PARALLEL-TO-SERIAL CONVERSION PORTION
12d TRANSMISSION PLL
23d RECEPTION TIMING CONTROL
24d TRANSMISSION TIMING CONTROL
31d RECEPTION ALIGNER
32d TRANSMISSION ALIGNER
22d SLAVE TIMING ADJUSTMENT PORTION

[FIG. 2A]
31 RECEPTION ALIGNER

[FIG. 2B]
32 TRANSMISSION ALIGNER

[FIG. 3]
30 START
31 IS CONTROL SIGNAL FOR TIMING ADJUSTMENT ACTIVE?
32 NOTIFY OUTSIDE OF BUSY STATE
33 RECEPTION ADJUSTMENT SEQUENCE
34 TRANSMISSION ADJUSTMENT SEQUENCE
35 NOTIFY OUTSIDE OF RELEASE FROM BUSY STATE
36 END

[FIG. 4]
M40 START
M41 TRANSMIT TEST PATTERN SIGNALS
M42 HAS SET TIME PASSED?
M43 END
S40 START
S41 RECEIVE TEST PATTERN SIGNALS
S42 CHECK AGAINST CORRECT PATTERN SIGNALS

S43 STORE CHECKING RESULT
S44 HAS TESTING OF ALL TIMINGS BEEN FINISHED?
S45 CHANGE RECEPTION TIMING
S46 READ CHECKING RESULTS
S47 SELECT OPTIMAL TIMING
S49 IS RESULT OK?
S48 STORE SELECTION RESULT
S50 DISPLAY ERROR
S51 SET RECEPTION TIMING
S52 END

[FIG. 5]
M80 START
M81 TRANSMIT ID
M82 HAS SET TIME PASSED?
M83 RECEIVE TEST PATTERN SIGNALS
M84 CHECK AGAINST CORRECT PATTERN SIGNALS
M85 STORE CHECKING RESULT
M86 HAS TESTING OF ALL TIMINGS BEEN FINISHED?
M87 READ CHECKING RESULTS
M88 SELECT OPTIMAL TIMING
M89 TRANSMIT SELECTION RESULT
M90 TRANSMIT TIMING CHANGE INSTRUCTION
M91 HAS ADJUSTMENT FOR ALL IDs BEEN FINISHED?
M92 UPDATE ID (ID←ID+1)
M93 OUTPUT FINAL RESULT AND STATUS
M94 END
M95 HAS SET TIME PASSED?
M96 TRANSMIT TERMINATION NOTICE
M97 HAS SET TIME PASSED?

[FIG. 6]
S80 START
S92 INITIALIZE TRANSMISSION TIMING
S81 HAS ID SIGNAL OR TERMINATION NOTICE SIGNAL BEEN RECEIVED?
S82 CHECK AGAINST ITS OWN ID AND HOLD RESULT
S83 IS THE NODE OF ITS OWN SPECIFIED?
S84 TRANSMIT TEST PATTERN
S85 TRANSMIT ALL 0
S86 HAS SELECTION RESULT SIGNAL OR TIMING CHANGE INSTRUCTION SIGNAL BEEN RECEIVED?
S87 CHANGE TRANSMISSION TIMING
S88 STORE SELECTION RESULT
S89 SET TRANSMISSION TIMING
S90 STOP TRANSMITTING TEST PATTERN SIGNALS
S91 END

[FIG. 7]
1 MASTER NODE
60a OPTICAL DEMULTIPLEXER
60b OPTICAL DEMULTIPLEXER
61a OPTICAL MULTIPLEXER
3b SLAVE NODE
3c SLAVE NODE
3d SLAVE NODE

What is claimed is:

1. A signal transmission system comprising:
a master node; and
a plurality of slave nodes for performing data transmission with the master node,
wherein the master node includes a serial-to-parallel converter for converting a serial data signal from each of the slave nodes into a parallel data signal, and
wherein each of the slave nodes includes a transmission aligner for performing word alignment processing upon a parallel data signal, and a parallel-to-serial converter for converting the parallel data signal subjected to the word alignment processing by the transmission aligner into a serial data signal, and outputting the serial data signal to the master node, and
wherein the master node includes a master timing adjustment portion for executing a reception adjustment sequence and a transmission adjustment sequence during a period in which data transmission is not carried out, the reception adjustment sequence being provided for adjusting reception timing between a data signal and a synchronization signal outputted by the master node individually for each slave node, the transmission adjustment sequence being provided for adjusting transmission timing between a data signal and a synchronization signal outputted by each slave node individually for each slave node.

2. A signal transmission system according to claim 1, wherein
the master node further includes a parallel-to-serial converter for converting a parallel data signal into a serial data signal and outputting the serial data signal to the slave nodes, and
wherein each of the slave nodes further includes a serial-to-parallel converter for converting the serial data signal from the master node into a parallel data signal, and a reception aligner for performing word alignment processing upon the parallel data signal converted by the serial-to-parallel converter.

3. A signal transmission system according to claim 1, wherein
each of the slave nodes includes a reception timing control portion for changing reception timing of a data signal, a transmission timing control portion for changing transmission timing of a data signal, and a slave timing adjustment portion for issuing an instruction in accordance with a command from the master timing adjustment portion, so that an instruction to change reception timing is given to the reception timing control portion during execution of the reception adjustment sequence so as to adjust the reception timing while giving an instruction of word alignment processing to the reception aligner, and an instruction to change transmission timing is given to the transmission timing control portion during execution of the transmission adjustment sequence so as to adjust the transmission timing while giving an instruction of word alignment processing to the transmission aligner.

4. A signal transmission system according to claim 3, wherein the master timing adjustment portion performs the reception adjustment sequence and the transmission adjustment sequence in that order.

5. A signal transmission system according to claim 1, wherein data transmission between the master node and each of the slave nodes is performed through an optical transmission medium.

* * * * *